(12) United States Patent
Richards et al.

(10) Patent No.: US 7,448,061 B2
(45) Date of Patent: Nov. 4, 2008

(54) FRAME SYNCHRONIZATION IN AN ETHERNET NTP TIME-KEEPING DIGITAL CINEMA PLAYBACK SYSTEM

(75) Inventors: Martin John Richards, Redwood City, CA (US); Douglas Evan Mandell, San Francisco, CA (US); Makarand Prabhakar Karanjkar, Fremont, CA (US); Pierre-Anthony Stivell Lemieux, San Mateo, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1037 days.

(21) Appl. No.: 10/873,407

(22) Filed: Jun. 21, 2004

(65) Prior Publication Data

US 2005/0283820 A1 Dec. 22, 2005

(51) Int. Cl.
*H04N 7/18* (2006.01)
(52) U.S. Cl. .................... 725/82; 725/116; 725/114; 709/204; 370/503
(58) Field of Classification Search .............. 348/422.1, 348/518; 352/85; 370/498, 503, 519; 709/204, 709/205, 248; 725/80, 82, 112, 116
See application file for complete search history.

(56) References Cited

U.S. PATENT DOCUMENTS

| | | | |
|---|---|---|---|
| 5,875,354 A | 2/1999 | Charlton et al. | |
| 5,896,524 A | 4/1999 | Halstread, Jr. et al. | |
| 6,016,550 A | 1/2000 | Kokkosoulis et al. | |
| 6,141,530 A * | 10/2000 | Rabowsky | 725/116 |
| 6,173,317 B1 * | 1/2001 | Chaddha et al. | 709/219 |
| 6,269,103 B1 | 7/2001 | Laturell | |
| 6,327,274 B1 | 12/2001 | Ravikanth | |
| 6,356,871 B1 | 3/2002 | Hemkumar et al. | |
| 6,384,893 B1 * | 5/2002 | Mercs et al. | 352/133 |
| 6,501,810 B1 | 12/2002 | Karim et al. | |
| 6,531,970 B2 | 3/2003 | McLaughlin et al. | |
| 6,532,274 B1 | 3/2003 | Ruffini | |
| 6,598,172 B1 | 7/2003 | VanDeusen et al. | |
| 6,700,640 B2 * | 3/2004 | Morley et al. | 352/40 |
| 7,269,843 B2 * | 9/2007 | Yamaguchi et al. | 725/141 |
| 7,274,761 B2 * | 9/2007 | Muller et al. | 375/354 |
| 7,346,698 B2 * | 3/2008 | Hannaway | 709/231 |
| 2002/0026321 A1 | 2/2002 | Faris et al. | |
| 2002/0069107 A1 | 6/2002 | Werner | |

(Continued)

FOREIGN PATENT DOCUMENTS

EP 1 427 218 A2 9/2004

OTHER PUBLICATIONS

Network Time Protocol Specification, Implementation and Analysis, David L. Mills, Mar. 1992, Network Working Group Request for Comments 1305, Version 3.*

(Continued)

*Primary Examiner*—Christopher Grant
*Assistant Examiner*—John Schnurr
(74) *Attorney, Agent, or Firm*—Gallagher & Lathrop P.C.; Thomas A. Gallagher

(57) ABSTRACT

In a digital cinema network of NTP-timekeeping devices in which one of the devices decodes video information, the scheduling of future instructions takes into account the differences between the nominal and actual frame rates of the video decoding device and the network's NTP latency.

24 Claims, 3 Drawing Sheets

U.S. PATENT DOCUMENTS

| | | |
|---|---|---|
| 2002/0116361 A1 | 8/2002 | Sullivan |
| 2002/0163932 A1 | 11/2002 | Fischer et al. |
| 2002/0172281 A1 | 11/2002 | Mantchala et al. |
| 2002/0188881 A1 | 12/2002 | Liu et al. |
| 2003/0039465 A1 | 2/2003 | Bjorgan et al. |
| 2004/0015983 A1* | 1/2004 | Lemmons .............. 725/12 |
| 2004/0062278 A1 | 4/2004 | Hadzic et al. |
| 2004/0090935 A1 | 5/2004 | Courtney |
| 2004/0102693 A1 | 5/2004 | Jenkins |
| 2007/0038999 A1* | 2/2007 | Millington .............. 718/100 |

OTHER PUBLICATIONS

Rowe, et al., "A Continuous Media Player," Computer Science Division-EECS. University of California, Nov. 1992.

Farrow, Rik, "Beating the Clock on Security," Network Magazine, Sep. 5, 2001.

Leitch, Application Notes—NTP, "Network Synchronization in a Broadcast Facility Utilizing Network Time Protocol," May 29, 2002.

Chuan, Ling Jenn, "Application Note—AN111 Using NTP Network Time Protocol Clock Sync," Pixelmetrix Corporation, 2003.

Orton, Mike, "Digital Cinema Feature," Digital Cinema Magazine, Apr. 29, 2004.

Pollastri, F., "The Time of Internet—Network Time Protocol (NTP)," downloaded from Internet on Jun. 18, 2004, but original publication date unknown.

Harris, Tom, "How Digital Cinema Works," Howstuffworks, downloaded from Internet Jun. 11, 2004, but original publication date unknown.

Dolby Laboratories, Inc., product information sheet for "Dolby Show Player," 2004.

* cited by examiner ved NTP time-keeping digital cinema playback system

TECHNICAL FIELD

The present invention pertains generally to digital cinema and pertains more specifically to methods and devices for a use in a network of devices in a digital cinema system.

BACKGROUND ART

The concept of "digital cinema" includes the production, delivery and presentation of aural/visual material in auditoriums or theatres using digital technology. Digital cinema programs typically are distributed in a compressed and encrypted form on physical media such as DVD-ROM, tape or computer hard drives and can in principle be distributed by electronic transmission using satellite or other broadband communication paths.

Digital cinema playback systems control the processes required to make a digital cinematic presentation. These processes include receiving and storing the digital cinema program, decompressing and deciphering it into digital video and audio bit streams that can be processed by digital content decoders, decoding the content of the bit streams to obtain signals that may be used drive video displays and audio amplifiers, and controlling other facilities such as special effects, curtains and theatre lighting that are found in a theatre auditorium.

Typical digital cinema playback systems include several pieces of equipment, devices, that communicate with one another through an electrical network that is similar to many networks that are used to interconnect computers. These networks often conform to a standard that is commonly known as Ethernet, which is described in the IEEE 802.3 standard, using a communication protocol known as the Transmission Control Protocol/Internet Protocol (TCP/IP). This choice of network and protocol can simplify the task of implementing a digital cinema playback system because the electrical and logical interfaces and procedures needed to use them are readily available and have relatively low cost.

In a digital cinema playback system, the devices on the network must be synchronized to each other, and to a master clock in a fashion analogous to that in a television broadcast facility. Typically, in a broadcast facility a master video clock signal source provides a reference for the entire facility. This signal, which is usually a video frame reference clock, is routed to all of the servers, tape machines, etc. via a dedicated hardware interface and provides an accurate timing signal. In addition, SMPTE timecode signals are used to synchronize multiple servers/tape machines to the same video frame. The SMPTE timecode is described in the SMPTE 12M design (Society of Motion Picture and Television Engineers, Recommended Practice 12M: 1999).

In a digital cinema playback system, the timing requirements are not as strict, but at least frame accurate timing is required among the networked devices, including the server, decoder, and automation devices.

A technology to synchronize real time clocks in computers on a network has been in use for a number of years. This is called Network Time Protocol, or NTP. Detailed specifications of version 3 of NTP are contained in "Network Time Protocol (Version 3) Specification, Implementation and Analysis," Network Working Group, Request for Comments: 1305, March, 1992. Although NTP has been used to synchronize the real time clocks in a broadcast station, NTP clocks are not used to synchronize frame dependent events, nor to ensure video frame synchronization across devices such as tape machines, servers, etc. Such frame synchronization has been provided in broadcast environments by dedicated hardware interfaces and/or additional device-interconnecting cables.

It would be desirable to provide the required video frame synchronization in a digital cinema playback system within an Ethernet interface and without the need to have such dedicated hardware interfaces and/or additional cables.

DISCLOSURE OF INVENTION

In a network of devices that keep NTP time and at least one device (e.g., a video decoder) that also keeps a video frame "time" in accordance with a free-running clock, which free-running clock is independent of NTP time, one would like to schedule one or more future events such that each event is rendered by one or more of the NTP-time-keeping devices on the network in synchronism with a particular video frame. Although such a schedule may relate each event to a particular video frame, the NTP-time-keeping devices must be instructed to perform functions relating to such events in NTP time.

The network, an Ethernet network, for example, has a time latency such that an instruction sent to a device is received after an unknown and variable length of time and an instruction sent to multiple devices is not received simultaneously by all of the devices. Thus, real-time instructions to the NTP-time-keeping devices are not feasible. Instructions expressed in NTP time instead must be sent in advance of the time an event is to be rendered. However, the need to instruct in advance in NTP time conflicts with the requirement to schedule events in synchronism with particular video frames because there is no long-term fixed relationship between NTP time and video frame time. NTP time and video frame time drift with respect to each other because the NTP time and the video frame time have different references—NTP time is synchronized to a highly stable and accurate external standard, whereas video frame time is determined by another clock that is not locked to NTP time, for example, a free-running clock that is subject to drift. Nevertheless, over a short period of time, the drift may be small and well within an acceptable tolerance. Thus, one may instruct an NTP-time-keeping device to perform a function at a future NTP time that is sufficiently in synchronism with a particular frame by predicting the future relationship between NTP time and video frame time. Such prediction may be accomplished by noting (as needed, in view of an upcoming event, or, preferably, continually) one or more then-current relationships between NTP time and video frame time (which may be expressed as a video frame number, for example). Based on such a prediction, instructions are sent to one or more network NTP-time-keeping devices to execute an instruction at a predicted future NTP time. The predicted NTP time should be sufficiently in the future so as to be greater than the expected maximum network latency (so that the device is likely to receive the instruction before the desired NTP time of execution) but less than the time by which the NTP time and video frames will have drifted apart to the extent that the rendered action is not within an acceptable degree of synchronism with the desired video frame. Ideally, the future NTP time associated with an instruction is based at least in part on recent video frame time information and is sent shortly before the desired time of execution. In addition to providing the greatest accuracy of synchronism with a desired frame, sending each instruction to a network NTP device shortly before its desired NTP time of execution has the advantage that the NTP device need only have a small buffer memory because there is no need for the device to queue up a large number of instructions as might otherwise be the case.

MODES FOR CARRYING OUT THE INVENTION

Introduction

Figure 1:
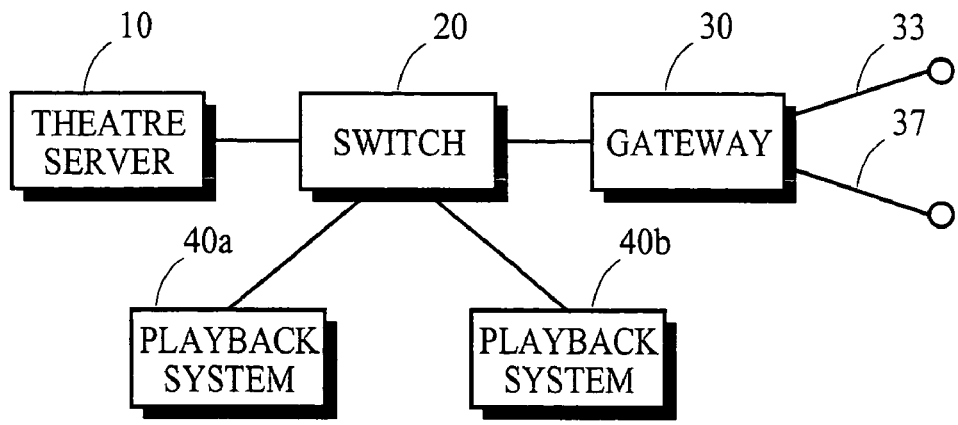
FIG. 1 is a functional schematic block diagram of a digital cinema network.

FIG. 1 illustrates a digital cinema network that has multiple playback systems. A typical system has a playback system for each auditorium in a digital cinema theatre complex; however, the network and equipment may be organized and installed in a wide variety of ways including, for example, multiple playback systems in a single auditorium with one or more screens. This latter arrangement allows multiple digital cinema programs to be presented simultaneously in one auditorium.

Referring to FIG. 1, a theatre management server 10, a gateway 30, and playback systems 40a, 40b are connected to one another by a network using a theatre network switch 20. Preferably, a Gigabit Ethernet or 1000 Base-T network is used. The theatre management server 10 performs a variety of services including administration and overall control of the playback systems 40a, 40b in the digital cinema network. Examples of these services are discussed briefly below. The gateway 30 is optional and provides a communication link between the digital cinema network and one or more communication paths such as a satellite communication link 33 or a terrestrial wideband network 37. Alternatively, the gateway may be incorporated into the switch 20 to provide a single switch/gateway or router device. The communication paths may be used to deliver information such as cinema promotional material and digital cinema program decryption keys. Virtual private networking or similar functions may be provided to better protect sensitive information such as decryption keys.

Theatre Management Server

In a typical installation, the theatre management server 10 provides services that are important to the operation and management of a theatre but it need not provide any services or perform any functions that are essential to the present invention. In one implementation, the theatre management server 10 provides services that allow personnel to configure and test theatre systems and equipment including playback systems, collect information describing the operation of the theatre systems, diagnose the cause of system malfunctions, receive and manage media content and decryption keys, assemble the media content into cinematic presentations or "shows," schedule and control the presentation of the shows, and assist with the management of licenses for media content including Digital Rights Management (DRM).

Playback System

Each playback system 40 may be functionally independent of all other playback systems in the network. A respective playback system 40 may operate to provide a digital cinematic presentation without requiring services from equipment in any other playback system.

The playback systems may be implemented in a variety of ways. A few ways are described in the following paragraphs.

Figure 2:
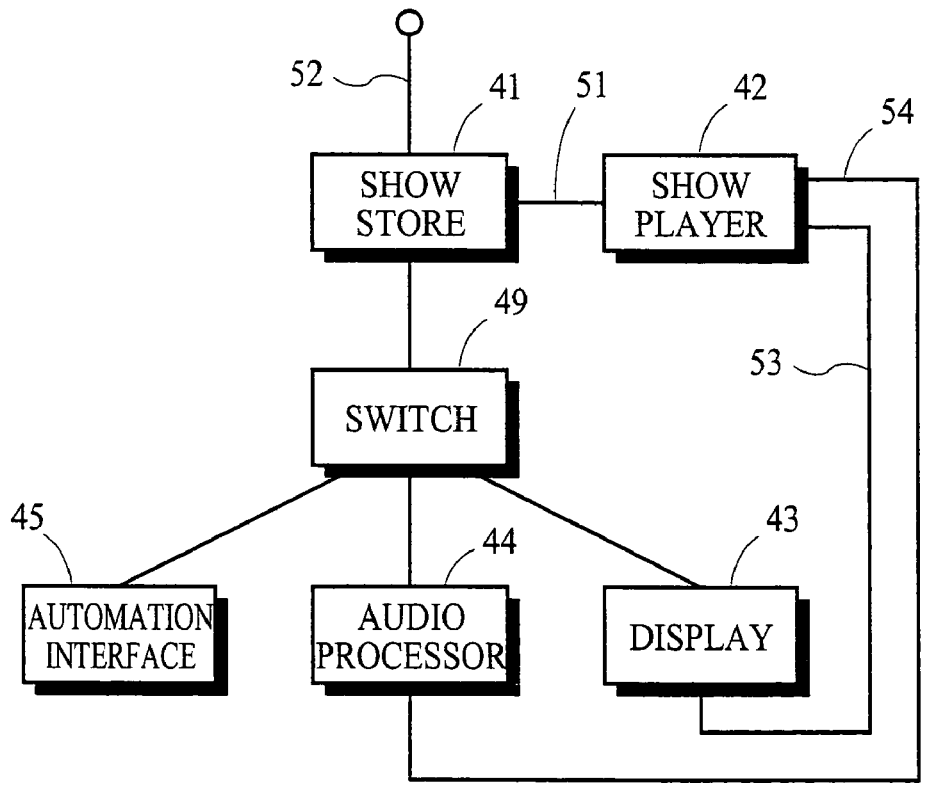
FIGS. 2-5 are functional schematic block diagrams of digital cinema playback systems.

The schematic block diagram shown in FIG. 2 illustrates one implementation of a playback system 40 that includes a show store 41, a show player 42, a display 43, an audio processor 44, an automation interface 45, and a switch 49. The switch 49 provides network connections between all of these devices except the show player 42. Communication paths 51, 53, 54 directly connect the show player 42 to the show store 41, the display 43 and the audio processor 44, respectively.

The show store 41 is connected to the network switch 20 through communication path 52 and acts as a file server to receive and store one or more digital cinema programs. The show store 41 may store show configurations, show schedules, and information related to licensing, DRM and encryption. The show store 41 extracts information from the stored programs, reformats the extracted information into an encoded representation that facilitates subsequent processing, and provides the encoded representation to the show player 42. Preferably, the encoded information is conveyed from the show store 41 to the show player 42 by a wideband communication path 51 such as a dedicated 1000 Base-T Ethernet path that connects directly between these two devices. In a typical implementation, the encoded representation conveys video information encoded according to some standard such as the MPEG-2 standard that is described in the International Standards Organization (ISO) Motion Picture Experts Group (MPEG) documents ISO/IEC 13818-1 through 13818-9, or the JPEG-2000 standard described in ISO/IEC 15444:2000, and conveys audio information that may be encoded as Pulse Code Modulation (PCM) data, MetaAudio Enhanced PCM data or data generated by an encoding process such as MetaAudio Dolby F. An example of a suitable show store 41 is the Dolby Show Store DSS100, available from Dolby Laboratories, San Francisco, Calif.

The show player 42 is a digital content decoder that decodes this encoded representation to obtain digital video and digital audio information, which are provided to the display 43 and the audio processor 44, respectively, through communication paths 53, 54. The encoded representation may be encrypted. If it is encrypted, the show player 42 uses an appropriate video-content decryption key to decipher the video content. Preferably, a technique is used such as that described in the Federal Information Processing Standards (FIPS) Publication 197 with key generation and exchange provided by techniques such as those described in RSA Cryptography Standard PKCS #1 v2.1 or in the IEEE 1363-2000 standard. The show store 41 receives the appropriate video-content decryption key from the theatre management server 10, which may store this key and subsequently pass it to the show player 42 as needed or which may pass the key to the show player 42 without storing it.

In one implementation, the show store 41 receives an encrypted version of the video-content decryption key that was encrypted using a public key uniquely associated with the show player 42. The show player 42 deciphers the encrypted video-content decryption key using its own private key, uses the video-content decryption key to decipher and decode the video information as required and, if desired, encrypts the decoded video information for subsequent delivery to the display 43. The encryption may conform to some standard or other specification such as the proposed Society of Motion Picture and Television Engineers (SMPTE) DC28.4 standard or it may conform to proprietary processes that are compatible with the display 43. An example of a suitable show player 42 is the Dolby Show Player, DSP100, available from Dolby Laboratories, San Francisco, Calif.

The display 43 receives the decoded video information from the show player 42, deciphers the information if necessary, and presents the video information for viewing. The display may be essentially any device that is capable of presenting the video information such as a liquid crystal display (LCD) panel or a projector that can project an image onto a screen or other display medium. Preferably, the decoded video information is conveyed directly from the show player 42 to the display 43 by a wideband communication path 53 in a form that is compliant with the High Definition Serial Data Interface (HD-SDI) as described in the SMPTE 292M standard. An example of a suitable display 43 is the model DP100 projector available from Barco N.V., Pres. Kennedypark 35, 8500 Kortrijk, Belgium.

The audio processor 44 receives the audio information from the show store 42, decodes the audio information if necessary, and applies filtering and equalization as desired to generate a signal that may be amplified for presentation by loudspeakers or other acoustic transducers. An example of a suitable audio processor 44 is the cinema sound processor model CP650, available from Dolby Laboratories, San Francisco, Calif. Preferably, the audio information is conveyed from the show player 42 to the audio processor 44 by a wideband communication path 54 that directly connects between these two devices and conforms to the SMPTE 276M standard.

The automation interface 45 generates signals in response to commands received through the switch 49 to control special effects, auditorium lighting, curtains and other components in a theatre automation system. An example of a suitable automation interface is the Network Automation Interface NA10, available from Dolby Laboratories, San Francisco, Calif.

The switch 49 switches traffic within the network of the playback system 40. In a preferred implementation, it supports a 1000 Mbs or faster network such as a 1000 Base-T network.

Figure 3:
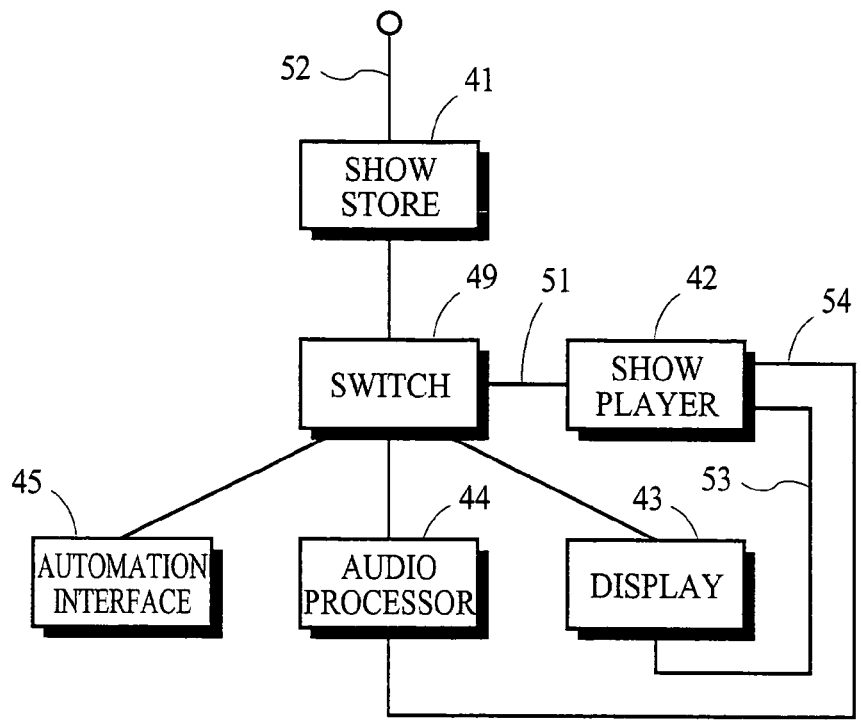

The schematic block diagram shown in FIG. 3 illustrates another implementation of a playback system 40 that is similar to the implementation shown in FIG. 2 except that a network connection to the show player 42 replaces the dedicated wideband communication path 51 between the show player 42 and the show store 41. This implementation imposes much higher bandwidth requirements upon the switch 49.

Figure 4:
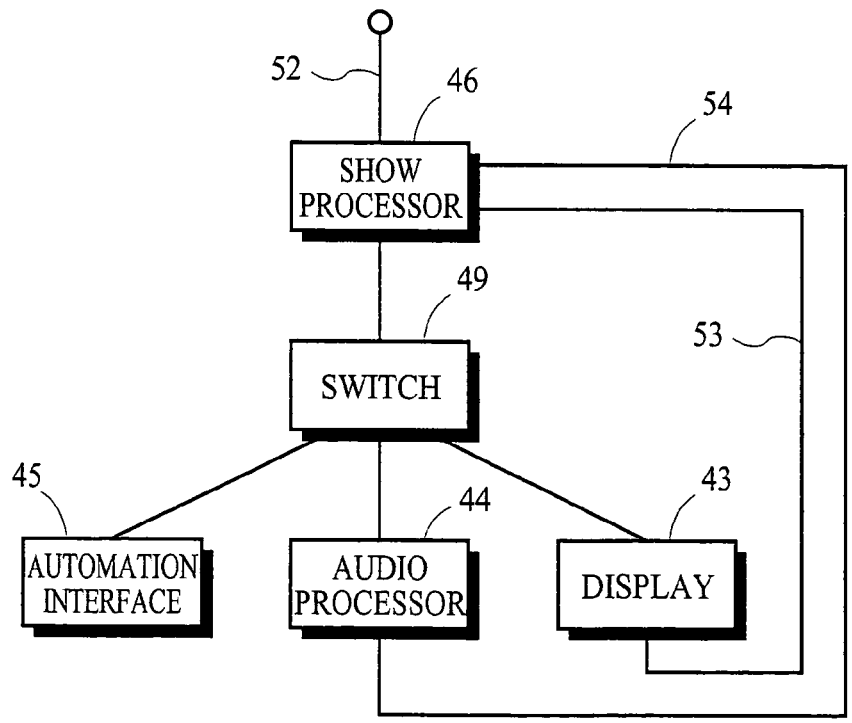

The schematic block diagram shown in FIG. 4 illustrates yet another implementation of a playback system 40 that is similar to the implementation shown in FIG. 2 except that the show store 41 and the show player 42 are incorporated into the same device, which is shown in the figure as show processor 46. This implementation imposes about the same bandwidth requirements upon the network and the switch 49 as that imposed by the implementation shown in FIG. 2.

Figure 5:
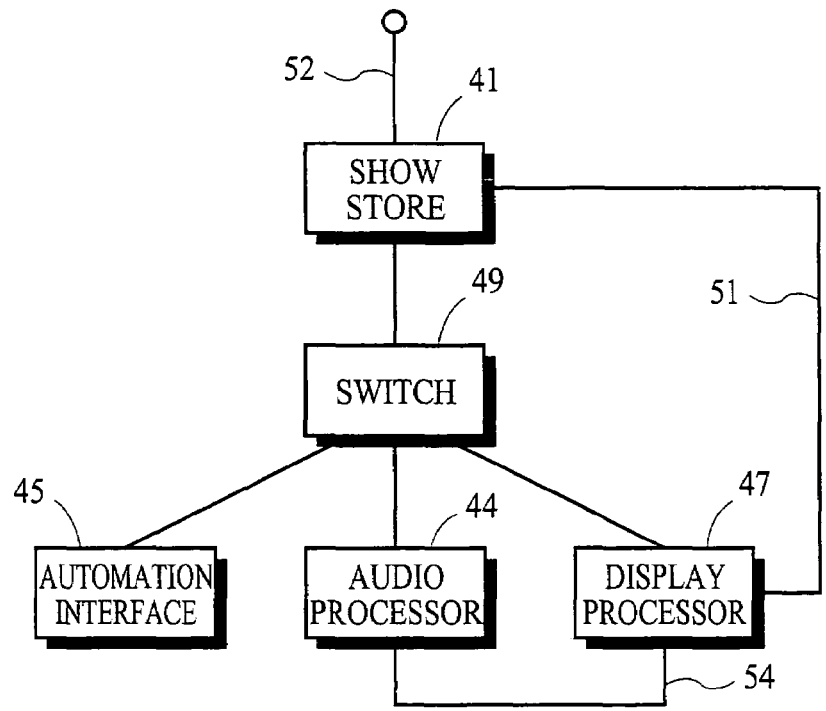

The schematic block diagram shown in FIG. 5 illustrates another implementation of a playback system 40 that is similar to the implementation shown in FIG. 2 except that the show player 42 and the display 43 are incorporated into the same device, which is shown in the figure as display processor 47. This implementation imposes about the same bandwidth requirements upon the network and the switch 49 as that imposed by the implementation shown in FIG. 2.

Frame Accurate Cues in an Ethernet NTP Time-Keeping Digital Cinema Playback System The use of Ethernet-only connections means that the method of synchronization used in a broadcast facility to obtain frame synchronization cannot be used, and that such synchronization information must be carried within the Ethernet interface. Unfortunately, as mentioned above, Ethernet utilizes a packetized protocol, with unknown and variable latencies (although there is a expected maximum latency in such a network). This makes real-time frame synchronization to the accuracy required impractical. For example, one requirement for a digital cinema playback system is that certain automation events (e.g., cues for artificial lightning bolts) should be synchronous to when a related picture is perceived by an audience to appear on the screen (it being understood that a particular type of automation event may have its own unique, but known, latency that requires the cue to be advanced in time by a suitable amount so that the event is perceived by an audience as occurring substantially in synchronism with a particular event on the cinema screen). Using the equivalent of a real-time reference pulse broadcast from a single source on the network to provide frame synchronization is not feasible because the latency (even in a local area network (LAN)) can be significantly more than the degree of required synchronism, which required synchronism may be in the order of a few milliseconds for certain automation events. Each of the devices listening for the pulse could receive it at a different time, depending upon the latencies in the network. It should be noted that the desired frame synchronization among devices on the Ethernet network does not relate to the synchronization of the cinema picture and soundtrack (artificial lightning bolts, as in the example mentioned above, are triggered by an automation interface and are independent of the cinema soundtrack). However, an automation interface synchronized in accordance with the present invention may be used, for example, to control soundtrack volume.

In accordance with aspects of the present invention, there is an NTP server, serving as the local NTP reference, on a network with which digital cinema devices are in communication. An example of such a network and devices are described in connection with the embodiments of FIGS. 2-5. The NTP server may be, for example, a Stratum 2 NTP server. Show store 41 may function as a Stratum 2 NTP server. Each of the digital cinema devices may be Stratum 3 client/servers, and synchronize their real time clocks to the Stratum 2 server and each other using normal NTP techniques. This typically ensures that their clocks are synchronized to better than 1 ms. It is assumed that the NTP time throughout the system is sufficiently accurate and has a resolution at least as fine as the highest video frame rate employed in the digital cinema system. In a Version 3 NTP system, the NTP timescale has a 64-bit counter in which the first 32 bits count integer seconds and the second 32 bits count fractional seconds. In principle, the frame to NTP time synchronization in accordance with the present invention may be configured to synchronize NTP time to the start, middle or other point of a video frame.

During playback of a digital motion picture, the show player 42 pulls audio and video data from the show store 41 and renders that audio and video, after decoding, at a frame rate determined by the show player's free-running decoder clock, which is not locked to the network's NTP time. For every video frame, the video decoder aspect of the show player 42 (FIGS. 2-5) sends a packet to show store 41 that includes a video frame number and an associated timestamp indicating the time that the show player decoder rendered that video frame. The timestamp is in NTP time derived from the show player's real-time clock that is synchronized using NTP to the other devices on the network. Although the show player 42 keeps NTP time for the purpose of communicating with other devices on the network, it pulls video data from the show store 41 and decodes such video data at a frame rate determined by a free-running clock. Each video frame has a consecutive frame number that was generated by the show store and appended to it. As the show player's decoder renders respective video frames, and it sends such frame numbers along with the NTP time at which it renders the video frame in the packets that it sends to the show store.

The show store 41 server contains the stored audio and video content, along with event cues (i.e., a schedule of future events) for other devices. Each cue entry in the schedule includes an identification of an event, the video frame with which it is to be synchronized, and the expected NTP time of the video frame. The expected NTP time is based on the nominal frame rate of the audio and video content and may be calculated at the start of playback. Although portions of the show content may have nominal frame rates that differ from one another (the content preferably includes metadata indicating its nominal frame rate to aid the decoder in decoding properly), this does not affect the principles of the present invention which are, in part, concerned with the difference between nominal frame rate (whatever it may be) and actual frame rate, which may differ slightly from the nominal frame rate due to drift in the decoder's free-running clock.

The expected NTP time of an event cue may be referenced to the start of the video content at the current nominal frame rate or to some other suitable point in the content subsequent to the start of the content at the current nominal content frame rate. For example, if an event is scheduled to be executed at the start of frame 24000 and the nominal frame rate for that content is specified at 24 frames per second, then the expected NTP time equals 1000 seconds plus the NTP time when the playback at 24 frames per second was started. For the sake of simplicity, if one assumes that the content playback started at 0 time, then the expected time of frame 24000 is 1000 seconds.

As mentioned above, the nominal frame rate may not be the actual frame rate because the video decoder's free-running clock has no fixed relationship to the NTP clock—it may have drift with respect to the NTP time. Thus, the expected NTP time of event cues may not be correct and may require adjustment in order that the audience perceives synchronism between an instructed event and the displayed picture.

To aid in adjusting expected NTP cue times, the show store 41 server monitors the succession of frame numbers being decoded by the video decoder in the show player 42, and it uses the show player's NTP timestamp associated with each of one or more of the then-current decoded frames to predict the NTP time in the future that an event should be acted upon. The show store 41 adjusts one or more of the future times in the schedule of instructions in response to at least one frame-time-to-NTP-time relationship subsequent to the start of the video information. For example, it may adjust in response to the starting relationship and a recent relationship or it may adjust in response to a recent relationship and a relationship between the starting time and the time of the recent relationship. The frame-time-to-NTP-time relationships should be observed while the video information has the same nominal frame rate. In the event of a change from one nominal frame rate to another, the start of the video information should be taken as the start of the current nominal frame rate.

For example, if an event is scheduled to be executed at the start of frame 24000, and the nominal frame rate for the video content is specified at 24 frames per second, but the actual frame rate is 23.98 frames per second, and a timestamp from a frame 10 seconds before the expected NTP time is used for a reference, then the predicted NTP time equals 1000.834 seconds from the content playback start time. For the sake of simplicity, if one assumes that playback started at 0 time, then the predicted NTP time equals 1000.834 seconds.

Accuracy of the prediction also depends on the age of the most recent data on which the prediction is based versus how far in the future the predicted time is. For greatest accuracy, the time between the most recent data and the predicted future time should be as short as possible, allowing, as may be necessary, for the passage of the one or more frames on which the prediction is based, the latency from the frame show 42 to the frame store 41 (where the event cue schedule is kept and the prediction is calculated) and the expected maximum latency time of the network. For the greatest continuing accuracy, predictions should be updated continually (every frame).

Instruction messages are sent from the show store 41 server to one or more other (addressed) devices (such as the automation interface 45) along with an NTP timestamp having the predicted NTP time for executing an instruction. Preferably, for greatest accuracy, instructions are sent a short time (greater than the network's expected maximum latency time but less than about one to ten or fifteen seconds, for example) before the instruction execution time.

In effect, the show store 41 server and the show player 42 decoder form a closed-loop feedback system so that events may be scheduled in a third device (such as automation interface 45), so that events triggered by the third device are synchronized with the rendering of a frame by the show player decoder.

It should be noted that the predicted NTP times should take into consideration the fixed latency between the output of the show player 42 decoder and the displayed picture at the output of the display 43 (FIGS. 2-5).

Although expected NTP times may be calculated prior to or at the time of starting playback of a show and adjusted one by one shortly before each cue is to be acted upon, for greater accuracy, it is preferred for the show store 41 (FIGS. 2-5) to calculate continually the actual frame rate and to use that information to adjust continually all of the remaining expected NTP times. Adjusting expected NTP times also has the advantage that such information may be used by the theatre server 10 (FIG. 1) to display playback duration and completion time with increased accuracy.

Upon receipt of an instruction message addressed to it, a device reads the timestamp, and at the instructed time, as determined by its own NTP synchronized clock, performs the instruction specified in the message. Thus, one or more devices execute instructions in a frame synchronous manner even though they are on an Ethernet and keep only NTP time with respect to each other. The devices have no other connection that would provide them with frame information, such as frame pulses. Thus, frame accurate cues (within a few milliseconds) may be rendered in an Ethernet NTP time-keeping digital cinema playback system.

Implementation

Figure 6:
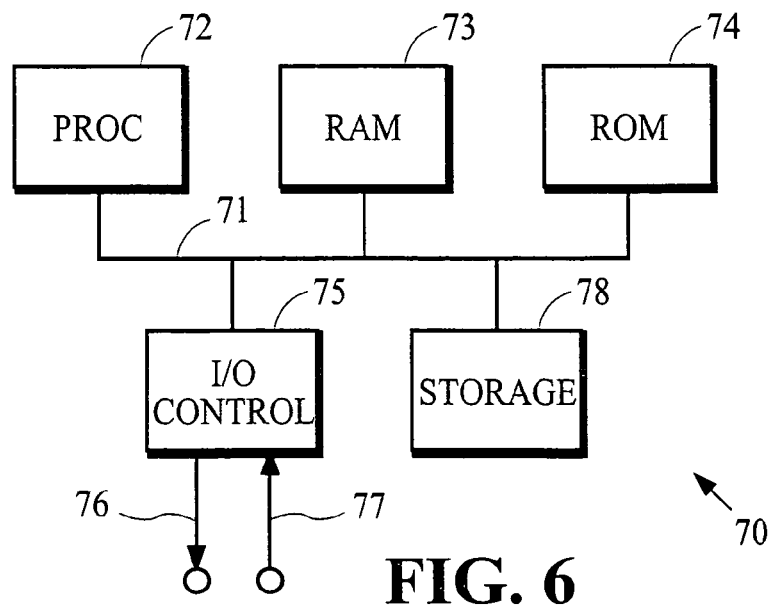
FIG. 6 is a functional schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 6 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general-purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention. Preferably, the computer system is tolerant to hardware failures. One way in which this may be done is to provide redundant components such as dual power supplies and redundant storage devices, and to use an operating system that is capable of detecting and reacting to faults.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

We claim:

1. In a digital cinema network of NTP-timekeeping devices, the network having a variable, but expected maximum, latency among its devices, one of the NTP-timekeeping devices decoding video information, which video information has a nominal frame rate, at an actual frame rate determined by a clock that is not locked to the network NTP time, the network having a schedule of instructions to be performed at one or more future frame times by one or more devices on the network, wherein the schedule's future NTP times corresponding to such future frame times are initially based on said nominal frame rate, a method of instructing said one or more devices with improved frame accuracy, comprising adjusting one or more of the future NTP times in said schedule of instructions in response to a measure of the actual frame rate, and sending at least one NTP-time-adjusted instruction to at least one device on the network, wherein the adjusted NTP time or times of the at least one instruction is or are at least as far in the future as the expected maximum network time latency.

2. A method according to claim 1 wherein said adjusting is performed repetitively.

3. A method according to claim 2 wherein said adjusting is performed every frame.

4. A method according to claim 1 wherein all future NTP times in the schedule are adjusted at least once.

5. A method according to claim 4 wherein all future NTP times in the schedule are adjusted repetitively.

6. A method according to claim 5 wherein all future NTP times in the schedule are adjusted every frame.

7. A method according to claim 1 wherein said devices include an automation interface device and said sending sends at least one NTP-time-adjusted instruction to the automation interface device.

8. A method according to claim 7 wherein said sending sends at least one NTP-time-adjusted instruction only to the automation interface device.

9. A method according to claim 1 wherein said measure of the actual frame rate is based at least in part on at least one frame-time-to-NTP-time relationship subsequent to the start of the video information.

10. Apparatus comprising:
memory; and
processing circuitry coupled to the memory, wherein the processing circuitry is adapted to perform the methods of any one of claims 1 through 8.

11. A computer program, stored on a computer-readable medium for causing a computer to perform the methods of any one of claims 1 through 8.

12. In a digital cinema network of NTP-timekeeping devices, the network having a variable, but expected maximum, latency among its devices, one of the NTP-timekeeping devices decoding video information, which video information has a nominal frame rate, at an actual frame rate determined by a clock that is not locked to the network NTP time, the network having a schedule of instructions to be performed at one or more future frame times by one or more devices on the network, wherein the schedule's future NTP times corresponding to such future frame times are initially based on said nominal frame rate, a method of instructing said one or more devices with improved frame accuracy, comprising adjusting one or more of the future NTP times in said schedule of instructions in response to at least one frame-time-to-NTP-time relationship subsequent to the start of the video information at said nominal frame rate, and sending at least one NTP-time-adjusted instruction to at least one device on the network, wherein the adjusted NTP time or times of the at least one instruction is or are at least as far in the future as the expected maximum network time latency.

13. A method according to claim 12 wherein said adjusting is performed repetitively.

14. A method according to claim 13 wherein said adjusting is performed every frame.

15. A method according to claim 12 wherein all future NTP times in the schedule are adjusted at least once.

16. A method according to claim 15 wherein all future NTP times in the schedule are adjusted repetitively.

17. A method according to claim 16 wherein all future NTP times in the schedule are adjusted every frame.

18. A method according to claim 12 wherein said devices include an automation interface device and said sending sends at least one NTP-time-adjusted instruction to the automation interface device.

19. A method according to claim 18 wherein said sending sends at least one NTP-time-adjusted instruction only to the automation interface device.

20. Apparatus comprising:
    memory; and
    processing circuitry coupled to the memory, wherein the processing circuitry is adapted to perform the methods of any one of claims 13 through 19.

21. A computer program, stored on a computer-readable medium for causing a computer to perform the methods of any one of claims 13 through 19.

22. In a digital cinema network of NTP-timekeeping devices, the network having a variable, but expected maximum, latency among its devices, one of the NTP-timekeeping devices decoding video information, which video information has a nominal frame rate, at an actual frame rate determined by a clock that is not locked to the network NTP time, the network having a schedule of instructions to be performed at one or more future frame times by one or more devices on the network, wherein the schedule's future NTP times corresponding to such future frame times are initially based on said nominal frame rate, a method of instructing said one or more devices with improved frame accuracy, comprising
    instructing said one or more devices based on a measure of the actual frame rate, wherein each instruction is for an NTP time at least as far in the future as the expected maximum network time latency.

23. A method according to claim 22 wherein said measure of the actual frame rate is based at least in part on at least one frame-time-to-NTP-time relationship subsequent to the start of the video information.

24. In a digital cinema network of NTP-timekeeping devices, the network having a variable, but expected maximum, latency among its devices, one of the NTP-timekeeping devices decoding video information, which video information has a nominal frame rate, at an actual frame rate determined by a clock that is not locked to the network NTP time, the network having a schedule of instructions to be performed at one or more future frame times by one or more devices on the network, wherein the schedule's future NTP times corresponding to such future frame times are initially based on said nominal frame rate, a method of instructing said one or more devices with improved frame accuracy, comprising
    instructing said one or more devices in response to at least one frame-time-to-NTP-time relationship subsequent to the start of the video information at said nominal frame rate, wherein each instruction is for an NTP time at least as far in the future as the expected maximum network time latency.

* * * * *